(12) United States Patent
Bertin et al.

(10) Patent No.: US 9,700,179 B2
(45) Date of Patent: Jul. 11, 2017

(54) LOW FRICTION SPATULA

(71) Applicants: Bruno Bertin, Mechanicsville, PA (US); Don Walker, II, Muscle Shoals, AL (US)

(72) Inventors: Bruno Bertin, Mechanicsville, PA (US); Don Walker, II, Muscle Shoals, AL (US)

( * ) Notice: Subject to any disclaimer, the term of this patent is extended or adjusted under 35 U.S.C. 154(b) by 0 days.

(21) Appl. No.: 14/928,278

(22) Filed: Oct. 30, 2015

(65) Prior Publication Data

US 2017/0119217 A1    May 4, 2017

(51) Int. Cl.
*A47J 43/28*    (2006.01)

(52) U.S. Cl.
CPC ................... *A47J 43/288* (2013.01)

(58) Field of Classification Search
CPC ........ A47J 43/18; A47J 43/283; A47J 43/288; B65G 7/12; A47G 21/045
USPC .................................................. 294/6–8, 173
See application file for complete search history.

(56) References Cited

U.S. PATENT DOCUMENTS

| | | | | |
|---|---|---|---|---|
| 952,746 | A | * | 3/1910 | Lane ..................... B44D 3/162 30/172 |
| 2,502,982 | A | * | 4/1950 | Norman ............... A47G 21/045 30/122 |
| 2,551,877 | A | | 5/1951 | Ditto |
| 2,571,465 | A | * | 10/1951 | McDevitt .................. B26B 3/04 294/9 |
| 2,601,360 | A | | 6/1952 | S |
| 2,862,754 | A | | 12/1958 | Bunning et al. |
| 3,730,579 | A | | 5/1973 | Mock |
| 3,753,587 | A | | 8/1973 | Godlewski |
| 3,796,454 | A | | 3/1974 | Spector et al. |
| 6,024,391 | A | | 2/2000 | Horn |
| 7,752,703 | B1 | * | 7/2010 | Silva ..................... E04F 21/162 15/235.8 |
| 9,408,486 | B2 | * | 8/2016 | Davis ................... A47G 21/045 |
| 2008/0203747 | A1 | * | 8/2008 | Stenglein .............. A47J 43/288 294/7 |

* cited by examiner

*Primary Examiner* — Stephen Vu
(74) *Attorney, Agent, or Firm* — Johnson Legal, PLLC

(57) ABSTRACT

A kitchen utensil comprises a handheld, low friction, cooking and serving spatula that includes: (a) a generally planar, elongated, blade exhibiting a rear portion connected to a handle, and a front portion extending a distance from the rear portion along a generally central axis between lateral sides of the blade; and (b) movable bearings restrained within in suitably dimensioned openings in the blade. These said bearings exhibit substantially free rotational motion within the blade plane to guide food on and off of the blade.

9 Claims, 6 Drawing Sheets

LOW FRICTION SPATULA

FIELD OF THE INVENTION

The invention relates to a cooking utensil, namely, a spatula that exhibits very low friction on delicate foods that must be removed from or delivered to a surface.

BACKGROUND OF THE INVENTION

Spatula cooking utensils have been used for a very long time and have been the subject of many efforts to improve the ease of using them to turn or flip food. For example, U.S. Pat. No. 2,551,877 describes a spatula that will automatically flip food passing through the device.

U.S. Pat. No. 2,601,360 is directed to a spatula with a hinged blade and a spring-biased lever that is said to facilitate flipping of pancakes and hamburgers.

U.S. Pat. No. 3,753,587 describes a spatula having one wall perpendicular to the other to facilitate pickup and flipping of foods from a fry pan.

U.S. Pat. No. 6,024,391 is a flipping spatula with a handle that is angled laterally towards the edge of the spatula.

U.S. Pat. Nos. 7,676,933; 7,900,329; and 8,613,144 provide a spatula having a solid blade and leading edge sections that can be replaced when the forward edge thereof becomes dulled.

Very few have addressed the issue of friction against the spatula blade. U.S. Pat. No. 1,801,672 describes a pie knife with a thin, flexible blade and a sharpened edge. Openings in the blade are used to increase the flexibility of the blade and reduce sticking.

U.S. Pat. No. 3,796,454 does not address friction but teaches a spatula having removable blades that exhibit different surface recesses for making different types of decorative embossing on pancake surfaces. Such surface recesses would likely increase friction between the blade and the embossed pancake.

Most spatula blades are made of metal or plastic with a tapered leading edge. The planar blade surface may be solid or pierced by one or more circular openings and/or slots that facilitate both cleaning and reduced surface area that might exert frictional or vacuum drag during the loading or unloading of the blade surface. As the amount of pierced surface area increases, however, the blade surface provides correspondingly less surface area for support. For some products (e.g., hamburgers, partially or wholly cooked pancakes, steaks and the like) the food exhibits adequate structural integrity to support its own weight across such gaps without incident or adverse effect.

For delicate foods that lack such structural integrity, e.g., certain types of fish under certain cooking processes, the frictional drag of the blade surface combined with the fluid vacuum drag effects of moist food moving across the blade surface can cause the food to tear and separate. Such adverse effects reduce the appearance of the plated food and can increase the need for caution when plating such products at the expense of kitchen productivity and chef frustration.

Thus, it would be desirable to have a kitchen utensil in the form of a spatula having a blade that exhibited very low friction when loading or unloading food from the surface thereof.

It is also imperative that any kitchen utensil be of a construction and structure to permit the utensil to be cleaned and sterilized. Closed corners and blind pockets can become places where food particles and juices might become trapped and foster the growth of undesirable microbial populations.

It would be, therefore, also desirable to provide a kitchen utensil in the form of a spatula that can be readily cleaned and sterilized.

SUMMARY OF THE INVENTION

It is an objective of the invention to provide a kitchen utensil in the form of a spatula having a blade of low friction and elongated length that is particularly well suited for removing and serving delicate foods, e.g., fish.

It is also an object of the invention to provide a kitchen utensil that avoids or minimizes corners or recesses that might trap food particles and be so difficult to clean as to serve as a source of unhealthy microbial growth.

In accordance with the aforementioned and other objectives that will be apparent from the description herein, a kitchen utensil according to the invention comprises a handheld cooking and serving spatula that comprises: (a) a generally planar, elongated, blade exhibiting a rear portion connected to a handle, and a front portion extending some distance from said rear portion along a generally central axis between left and right lateral sides; and (b) movable bearings restrained within the plane of said blade in a suitably dimensioned opening in said blade, said bearings exhibiting substantially free rotational motion within said plane to guide food on and off of said blade.

The kitchen utensil according to the invention has a blade structure that provides both exceedingly low friction to loading and unloading food from the blade surface while also exhibiting an open structure that allows for thorough cleaning and sterilization. The optional use of roller bears positioned at an angle relative to the axis of the

DETAILED DESCRIPTION OF THE INVENTION

Figure 1:
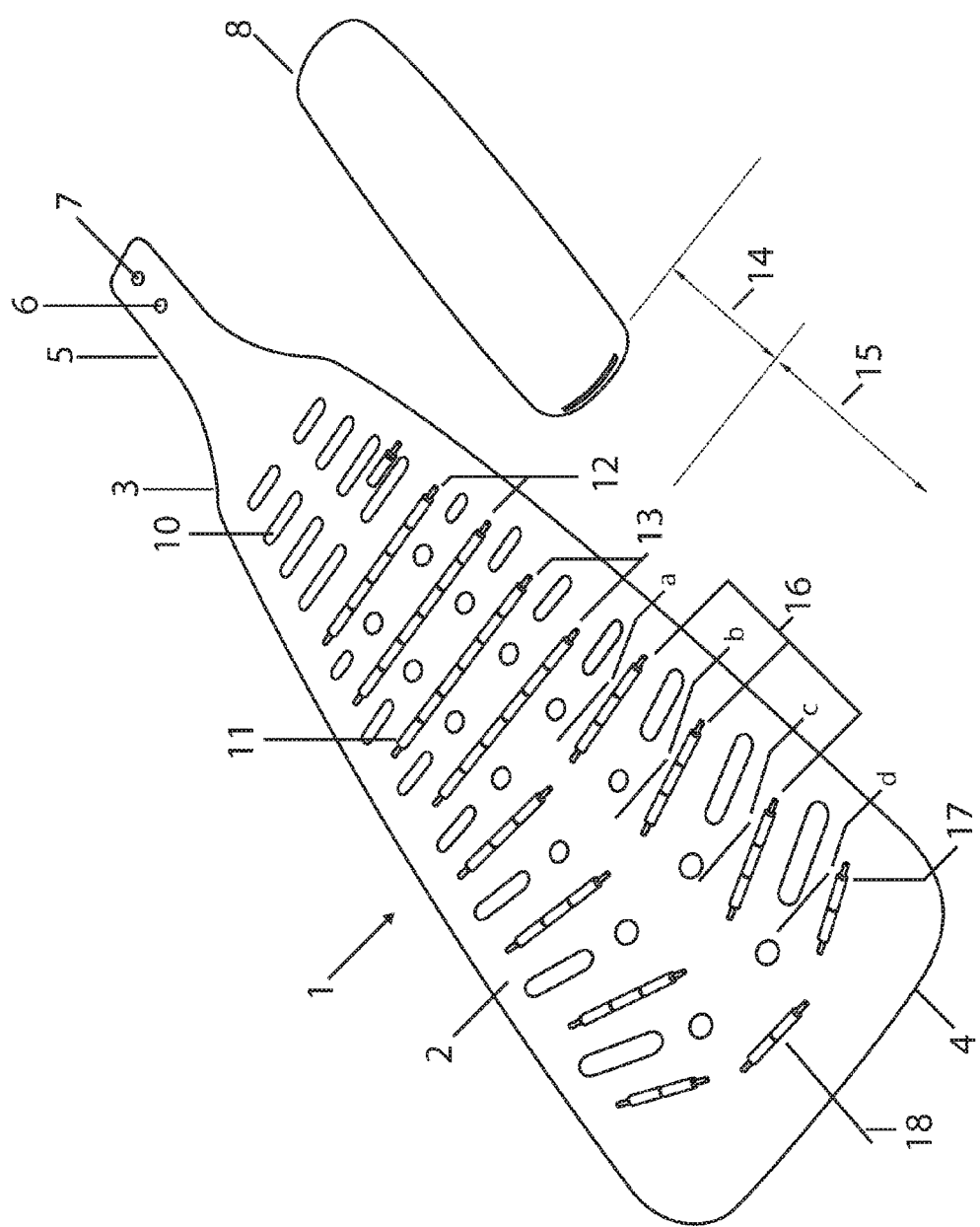
FIG. 1 shows a general view of a spatula according to the invention in which the handle is separate from the blade and tang. The leading edge of the blade is substantially transverse to the central axis of the blade.

The invention relates to kitchen utensils in the shape of a spatula with a low friction surface using roller bearings that protrude both above and below the top and bottom surfaces, respectively, of the spatula blade. When multiple bearings are used at discrete locations or in designated arrangements over the surface of the spatula blade, the roller bearings substantially reduce the friction associated with loading or unloading food from the blade.

The roller bearings can be spherical in shape but preferably exhibit a cylindrical, annular shape that permits such bearings to be rotatably supported by a support rod. Cylindrical bearings will rotate about their central support axis and thereby provide reduced friction in the direction of permissible rotation and hinder movement of the food in a direction other than parallel to the rotation direction. For example, mirror image sets of cylindrical roller bearings near the leading edge of the blade in which both set angles outwardly and away from the central axis of the blade will tend to urge foods together when loading the blade and apart when unloading. Conversely, mirror image sets of cylindrical roller bearings near the leading edge of the blade in which both set angles inwardly and towards the central axis of the blade will tend to urge foods apart when loading the blade and together when unloading. A combination in which sets of cylindrical roller bearings at the leading edge of the blade are at an angle relative to the central axis of the blade but parallel to each other can be used to turn the food about a pivot point when loading or unloading the food from the blade. Thus, the use of combinations of transverse and angled cylindrical roller sets can provide a degree of directionality for the food product as it enters or leaves the blade.

Roller bearings can be used individually or in sets of, e.g., 2-20. Spherical bearings are desirably used as individual units. Cylindrical bearings function well as individual units or as collections that can extend up to almost the entire width of the spatula blade. Cylindrical sets of roller bearings preferably have 2, 3, 4, 6, 8 or even 10 cylindrical bearings on a single support rod.

As noted above, cylindrical roller bearings preferably have an annular cross section shape. A support rods of an appropriately smaller diameter fits within the central opening of the annulus and extends beyond the overall length of the roller bearing or collection of roller bearings on each support rod so as to provide a length of support rod on each end of the roller bearing or set of roller bearings that can be secured to the blade. Preferably, the blade exhibits suitably dimensioned slots in which the roller bearings fit so as to rotate freely about the support rod yet be exposed at both the top and bottom of the blade. Each blade slot or opening for a roller bearing desirably also exhibits a further, narrower slot into which the support rod is placed and secured to the blade by welding, soldering, etc. As it is undesirable that roller bearings should slip off a support rod during use and potentially become intermixed with food intended for consumption, spot and micro-welding of the support rod to the blade is preferred at each end of the supported roller bearing or collection of roller bearings.

Exposed cylindrical bearings on the top and bottom blade surfaces means that the bottom bearings will rotate so as to urge the spatula away from the food and the food rolls onto the spatula and causes the exposed bearings to rotate. Thus, the user may find it convenient to use a scooping action of an angle that lifts the exposed bearing surfaces at the bottom of the blade away from the cooking surface or serving plate. The corresponding delivery of food from the spatula blade to a surface will involve the same type of action to resist the effects of exposed rollers urging the spatula forward into the served surface.

The blade of the spatula can also exhibit one or more holes or slots that are open and not occupied by a roller bearing or set thereof. Such openings held clear the blade surface of juices that might facilitate a vacuum attraction between the blade surface and the carried food while also improving flexibility of the blade.

The leading edge of the spatula blade can be transverse to the blade central axis or angled with respect thereto. The use of an angle can provide a customized feel for right-handed or left-handed chefs when using the utensil.

The blade can be made of any of a variety of materials, e.g., metals such as stainless steel, and plastics such a polypropylene or polyethylene of suitable density and with or without fiber reinforcement.

A rear handle on axis with the blade may be made as an integral portion of the blade by extending the rear of the blade. Alternatively and preferably, a discrete handle is attached to an extended tang formed from the rear portion of the blade. The tang desirably has one or more holes to facilitate the attachment of the handle by transverse pins or interlockable members on opposite halves of mating handle sections, e.g., biased clips that engage in corresponding openings in the opposite handle section.

Preferably, the handle is made is a material of lower heat conductivity than that of the blade to thermally insulate the handle from conductive heat from the blade. Preferred handle materials include formed plastic, wood, and composites.

The attached figures are provided to facilitate an understanding of the invention without limiting the scope of the attached claims. Similar structures in each figure are designated with the same reference number.

FIG. 1 depicts a kitchen utensil in the form of spatula 1 made of an extended metal blade 2 that tapers outwardly in width from rear portion 3 to front edge 4. Tang 5 extends from rear portion 3 and exhibits a pair of bore holes 6, 7 through which handle 8 can be attached with transverse pins (not shown) or an engageable connection of opposing halves of handle 8. In addition to openings 9 and empty slots 10, blade 2 also exhibits collections of cylindrical roller bearings 11 in sets of two, three, five and six bearings. Five-bearing set 12 is the rearmost set. Six-bearing sets 13 are located in the back middle section 14 of blade 2. The front middle section 15 and up to front edge 4 use three-bearing sets 16 and two-bearing sets 17 that are disposed in mirror image pairs at increasing angles a, b, c, d away from central blade axis 18.

Figure 2:
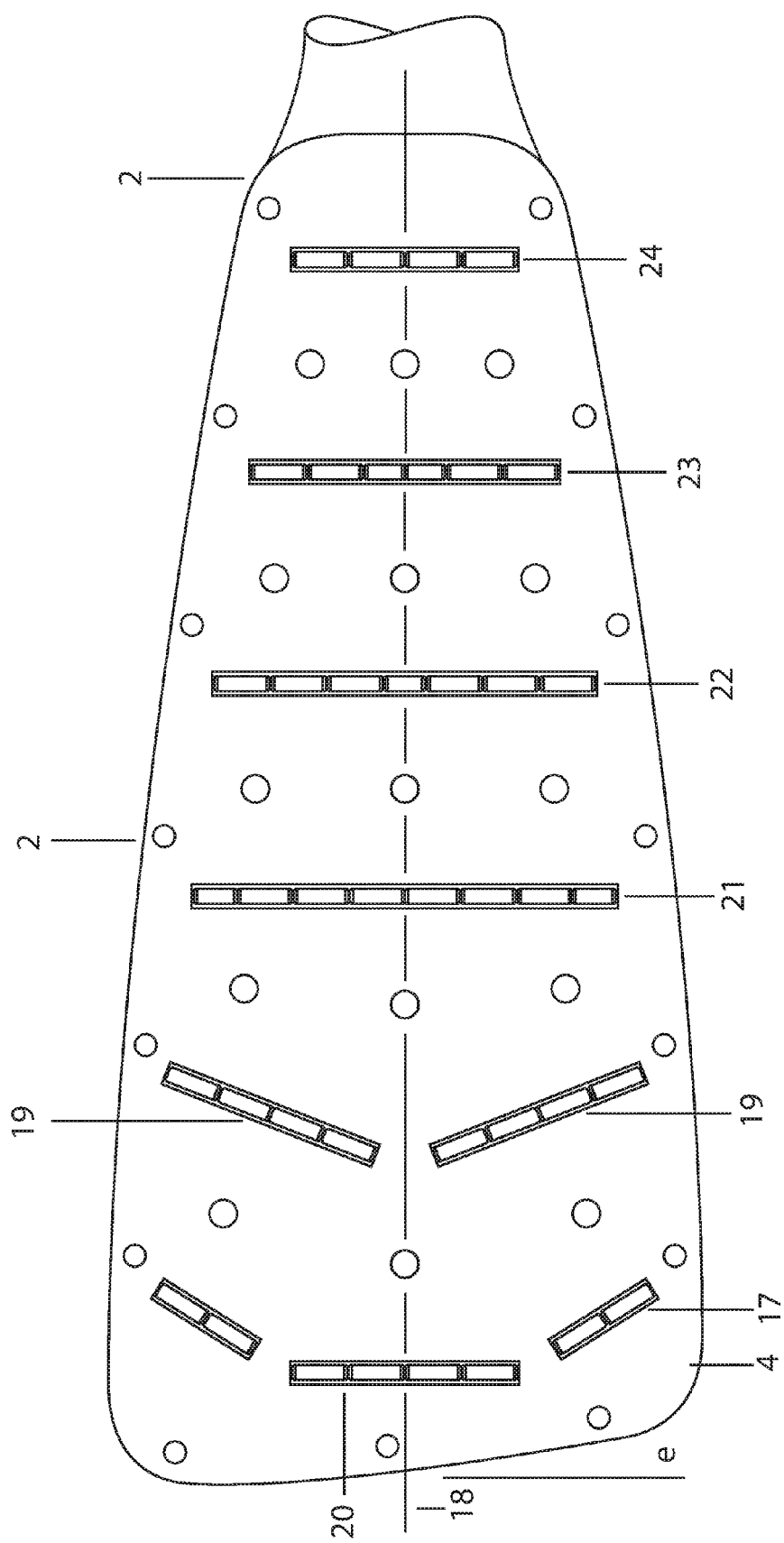
FIG. 2 illustrates details of the blade section that have collections of cylindrical roller bearings disposed transverse to the blade axis and substantially parallel to other transverse bearing sets and mirrored pairs of bearings that are disposed at a nonzero angle relative to the blade axis. In this embodiment, the bearing sets at the leading edge of the blade are outwardly and away from the central axis of the blade. The leading edge of the blade also exhibits an angle relative to the central axis of the blade that is down and to the left that is more convenient for a right-handed user.

As shown in FIG. 2, front edge 4 exhibits an angle e relative to central axis 18. Four-bearing angled sets 19 are also used in the front half of blade 2 with a four-bearing transverse set 20 nearest front edge 4. The rear half uses transverse eight-bearing set 21, seven-bearing set 22, six-bearing set 23 and, at rear portion 3, a four-bearing set 24.

Figure 3:
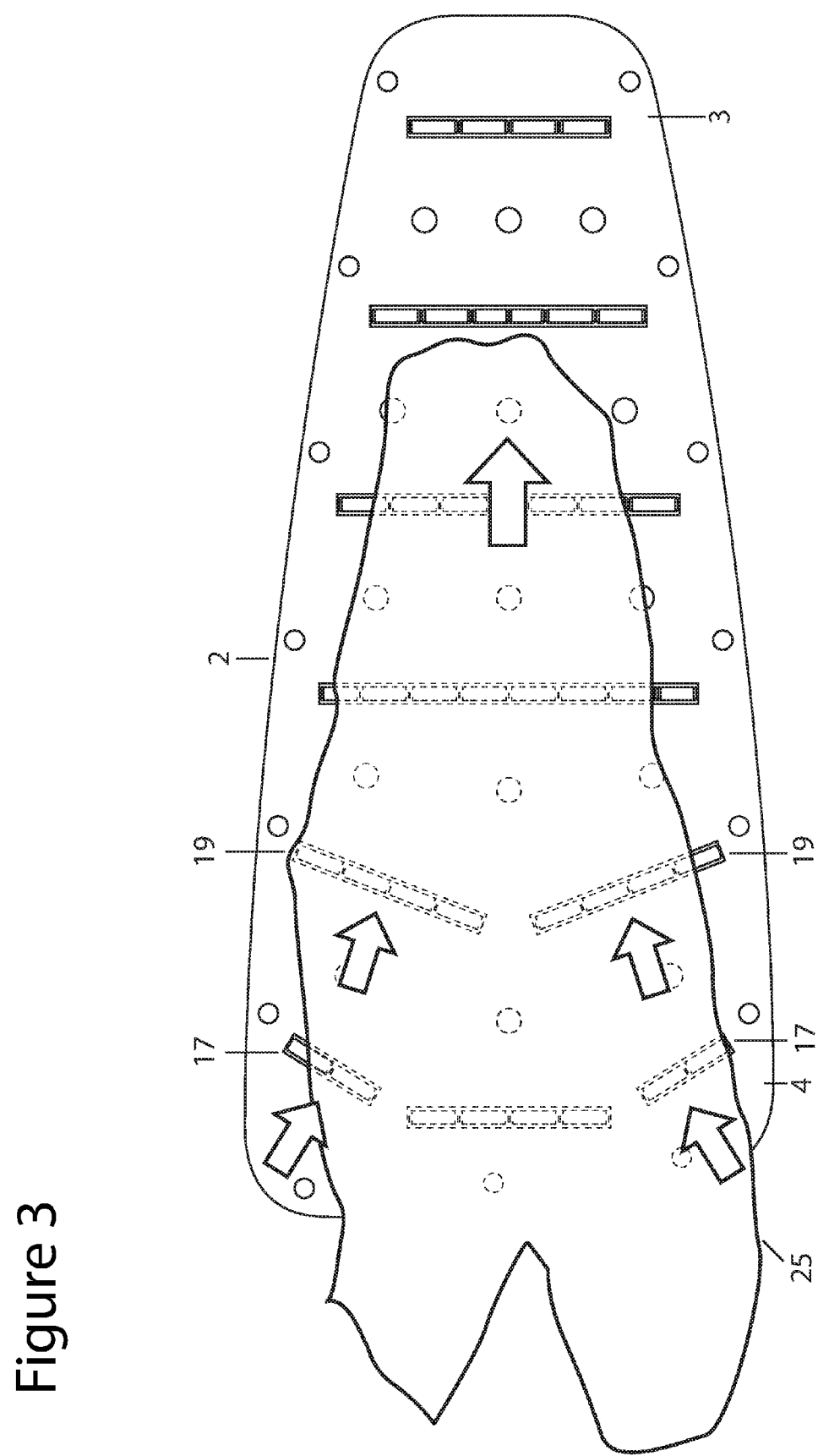
FIG. 3 depicts the different directional forces presented by the sets of transverse and angled bearings.

FIG. 3 illustrates the loading of food 25 onto blade 2 with inward urgings by angled sets of roller bearings 17, 19.

Figure 4:
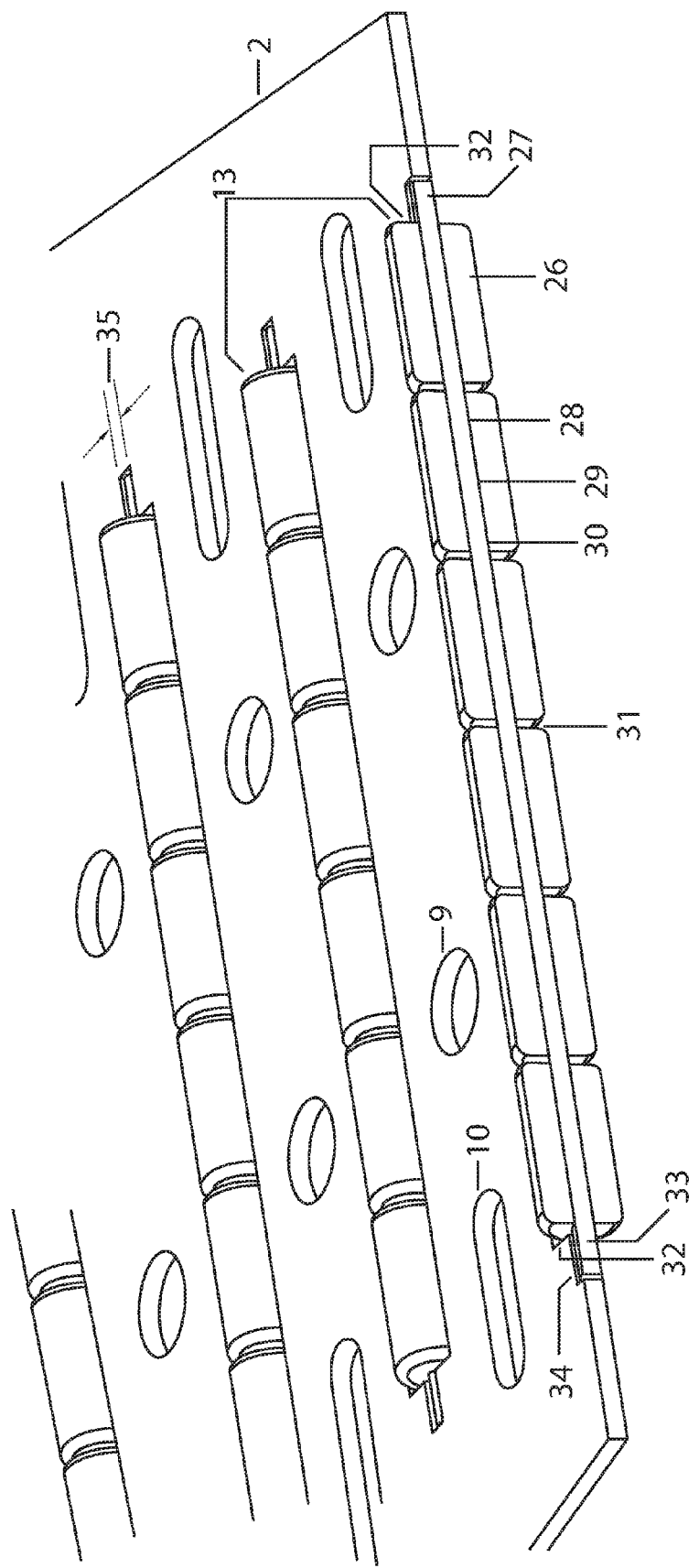
FIG. 4 is a cutaway view of a set of transverse annular bearings having a cylindrical outer shape that are disposed on a support rod that is set within the thickness of the blade and secured at either end thereto.

FIG. 4 is a cut-away section of a six-bearing set 13 of cylindrical roller bearings 26 that are mounted on support rod 27. The degree of clearance between the outer diameter 28 of support rod 27 and the inner diameter 29 of central opening 30 in bearings 26 as well as inter-bearing distance 31 should be selected to provide free rotation and allow cleaning of spaces therein.

Figure 5:
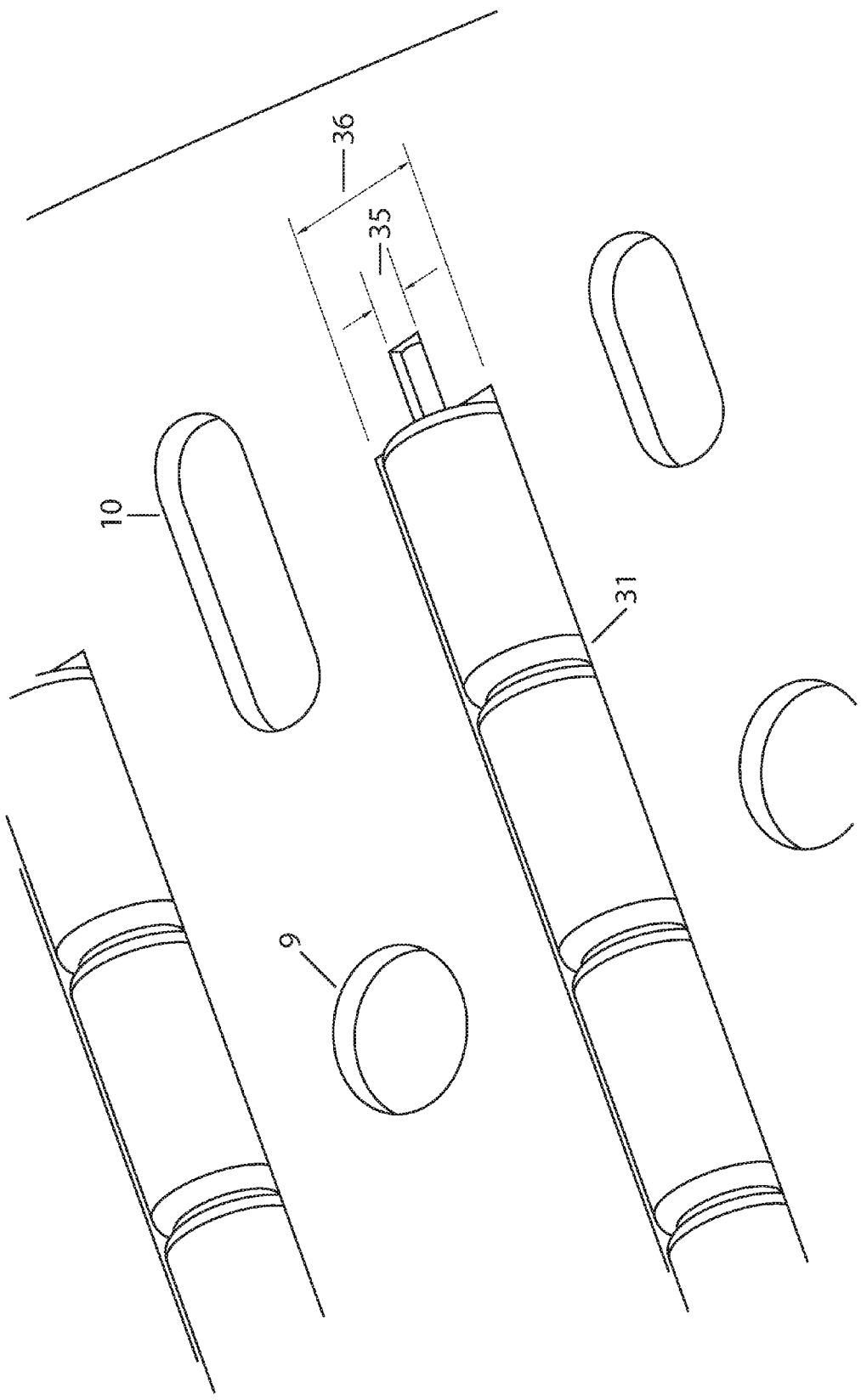
FIG. 5 presents a top view showing cylindrical bearings within a slot in the blade and having the bearing support rod extend beyond the bearings for attachment to the blade by welding or similarly permanent attachment.

FIGS. 4 and 5 show that each set of bearings 26 fit within a suitably dimensioned slot opening 32 in blade 2. The termination ends 33 of support rod 27 fit within slot extensions 34 that exhibit a width 35 that is less than the width 36 of slot opening 32 and marginally larger than the diameter of support rod 27. Support rod 27 is preferably secured to blade 2 and in each slot extension 34 by welding, spot-welding or micro-welding of blade 2 is metal and by ultrasonic welding in blade 2 is plastic.

Figure 6:
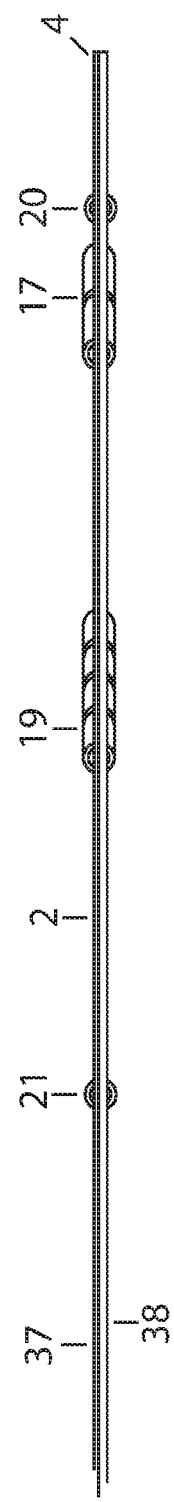
FIG. 6 discloses a side view of the spatula blade in which the cylindrical roller bearings extend both above and below the top and bottom of the blade.

FIG. 6 is an edge view of blade 2 from FIG. 2. This view illustrates how transverse eight-bearing set 21, and angled four-bearing set 19, two-bearing set 17 and bearing set 20 protrude above the upper and lower surfaces 37, 38 of blade 2.

What is claimed is:

1. A handheld cooking and serving spatula that comprises:
   a generally planar, elongated, blade exhibiting a rear portion connected to a handle, and a front portion extending a length from said rear portion along a generally central axis between first and second lateral sides; and
   movable bearings restrained within said blade in a suitably dimensioned opening in said blade and extending above an upper surface of said blade, said bearings exhibiting substantially free rotational motion to guide food in contact with said bearings on and off of said blade.

2. A spatula according to claim 1 wherein said movable bearings are generally cylindrical in shape with a central opening along an axial length of each cylindrical bearing, and each bearing or collection of said bearings is rotatably supported on a rod that extends through the central opening of each and which is secured to said blade.

3. A spatula according to claim 2 wherein said blade exhibits transverse slots and angled slots relative to said central axis, said spatula further comprising:
   a first set of cylindrical roller bearings that are disposed on a first support rod that extends across a first transverse slot, both ends of said support rod being secured to said blade; and
   a second set of cylindrical roller bearings that are disposed on a second support rod that extends across an angled slot, both ends of said rod being secured to said blade, said angled slot extending in a direction along said blade surface that is at an acute, non-zero angle relative to said central axis.

4. A spatula according to claim 3 wherein the angled slot extends at an angle within the range of 5-40 degrees relative to said central axis.

5. A spatula according to claim 3 comprising 1-6 sets of cylindrical roller bearings in transverse slots and 1-10 sets of second cylindrical roller bearings in angled slots.

6. A spatula according to claim 5 wherein said second sets of cylindrical roller bearings are disposed on said blade surface in mirror image pairs.

7. A spatula according to claim 1 further comprising a handle attachment tang that extends from said rear portion of said blade surface.

8. A spatula according to claim 7 wherein a gripping handle is attached to said tang and said gripping handle is made of a nonmetallic material that thermally isolates the handle from heat that is conducted to said tang from said blade surface.

9. A spatula according to claim 1 wherein said movable bearings are spherical and rotatably restrained between upper and lower surfaces of said blade.

* * * * *